US012666288B2

(12) United States Patent　　　　　(10) Patent No.:　　US 12,666,288 B2
Ye et al.　　　　　　　　　　　　　　　(45) Date of Patent:　　　Jun. 23, 2026

(54) LARGE-SCALE CHARACTERISTIC PARAMETER MEASUREMENT METHOD AND APPARATUS, AND NODE AND STORAGE MEDIUM

(71) Applicant: ZTE CORPORATION, Guangdong (CN)

(72) Inventors: Xinquan Ye, Guangdong (CN); Shujuan Zhang, Guangdong (CN); Yijian Chen, Guangdong (CN); Guanghui Yu, Guangdong (CN); Zhaohua Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 451 days.

(21) Appl. No.: 18/270,721

(22) PCT Filed: Dec. 21, 2021

(86) PCT No.: PCT/CN2021/139958
　　§ 371 (c)(1),
　　(2) Date: Dec. 5, 2023

(87) PCT Pub. No.: WO2022/143288
　　PCT Pub. Date: Jul. 7, 2022

(65) Prior Publication Data
　　US 2025/0310801 A1　　　Oct. 2, 2025

(30) Foreign Application Priority Data
　　Dec. 31, 2020　(CN) .......................... 202011628336.4

(51) Int. Cl.
　　*H04W 24/08*　　　(2009.01)
　　*H04L 5/00*　　　　(2006.01)

(52) U.S. Cl.
　　CPC .......... *H04W 24/08* (2013.01); *H04L 5/0048* (2013.01); *H04L 5/0082* (2013.01)

(58) Field of Classification Search
　　CPC .... H04W 24/08; H04W 72/23; H04L 5/0048; H04L 5/0082; H04L 5/0032; H04L 5/0091; H04L 27/261; H04L 5/0023
　　See application file for complete search history.

(56) References Cited

U.S. PATENT DOCUMENTS

2019/0058517 A1* 　2/2019 　Kang ................... H04B 7/0695
2019/0260425 A1* 　8/2019 　Ji ........................... H04L 5/0091
　　　　　　　　　　　(Continued)

FOREIGN PATENT DOCUMENTS

AU　　　2019267977 A1　　12/2020
CN　　　108024274 A　　　5/2018
　　　　　　　　(Continued)

OTHER PUBLICATIONS

International Search Report for the International Application No. PCT/CN2021/139958, mailed Mar. 8, 2022, 4 pages.
　　　　　　　　(Continued)

*Primary Examiner* — Kan Yuen
(74) *Attorney, Agent, or Firm* — KDW FIRM PLLC

(57) ABSTRACT

Provided are a large-scale property parameter measurement method and apparatus, a node and a storage medium. The large-scale property parameter measurement method includes acquiring indication information which includes quasi co-location (QCL) association information and first time window information and measuring a large-scale property parameter of a first reference signal according to the indication information.

15 Claims, 4 Drawing Sheets

Acquire indication information　　　⟋ S101

Measure a large-scale property parameter of a first reference signal according to the indication information　　　⟋ S102

(56)                    References Cited

U.S. PATENT DOCUMENTS

| | | | |
|---|---|---|---|
| 2021/0058113 A1* | 2/2021 | Jung | H04B 7/088 |
| 2021/0058212 A1* | 2/2021 | Si | H04L 5/0094 |
| 2021/0135821 A1* | 5/2021 | Guan | H04L 5/0048 |
| 2023/0171062 A1* | 6/2023 | Khoshnevisan | H04B 7/06968 |
| | | | 370/329 |

FOREIGN PATENT DOCUMENTS

| | | | |
|---|---|---|---|
| CN | 108111272 A | 6/2018 |
| CN | 110944348 A | 3/2020 |
| CN | 110958628 A | 4/2020 |
| CN | 112822779 A | 5/2021 |
| CN | 112865941 A | 5/2021 |
| WO | 2018082696 A1 | 5/2018 |
| WO | 2019182806 A1 | 9/2019 |
| WO | 2019214663 A1 | 11/2019 |

OTHER PUBLICATIONS

Extended European Search Report for EP Application No. 21914027. 4, dated Nov. 4, 2024, 10 pages.
Chinese Office Action in CN Application No. 2020116283364 dated Mar. 26, 2026, 5 pages.

* cited by examiner

LARGE-SCALE CHARACTERISTIC PARAMETER MEASUREMENT METHOD AND APPARATUS, AND NODE AND STORAGE MEDIUM

CROSS-REFERENCE TO RELATED APPLICATIONS

This application is a national stage application filed under 35 U.S.C. 371 based on International Patent Application No. PCT/CN2021/139958, filed on Dec. 21, 2021, which claims priority to Chinese Patent Application No. 202011628336.4 filed with the CNIPA on Dec. 31, 2020, disclosures of which are incorporated herein by reference in their entireties.

TECHNICAL FIELD

The present application relates to the field of wireless communication technology, for example, a large-scale property parameter measurement method and apparatus, a node and a storage medium.

BACKGROUND

When the reference signals sent from two different antenna ports have the same large-scale property parameter, the two antenna ports are in a quasi co-location (QCL) relationship. If the first reference signal and the second reference signal are quasi co-located, the corresponding parameter of the first reference signal may be referred to when the second reference signal adopts a large-scale property parameter.

In a future dense network or a large-scale distributed or cellular-free network, the spatial distribution of access points (APs) in a given area is more dispersed than that of centralized APs used in the new radio (NR), and the number of APs is larger. Multiple APs serve multiple pieces of user equipment (UE) simultaneously. In this case, when a UE moves in the area or an AP/UE joins/exits cooperative transmission, the serving AP set of a specific UE may change, so that the interference situation changes, and the corresponding demodulation reference signal needs to be adjusted. In this case, correct demodulation of the second reference signal cannot be ensured according to the QCL relationship between the first reference signal and the second reference signal. If the large-scale property parameter of the first reference signal is to be used by the second reference signal according to the QCL relationship, it is necessary to ensure that the large-scale property parameter of the first reference signal is measured accurate enough. Different large-scale property parameters have different sensitivity to time changes. Therefore, there is no solution to the preceding problem.

SUMMARY

The present application provides a large-scale property parameter measurement method and apparatus, a node and a storage medium, in order to measure the large-scale property parameter of a first reference signal according to QCL association information within a time range defined by first time window information included in the acquired indication information.

An embodiment of the present application provides a large-scale property parameter measurement method. The method is applied to a first node.

The method includes acquiring indication information, where the indication information includes QCL association information and first time window information; and measuring a large-scale property parameter of a first reference signal according to the indication information.

An embodiment of the present application provides a large-scale property parameter measurement method. The method is applied to a second node.

The method includes configuring indication information; and sending the indication information; where the indication information includes QCL association information and first time window information.

An embodiment of the present application provides a large-scale property parameter measurement apparatus. The apparatus includes an acquisition module and a measurement module.

The acquisition module is configured to acquire indication information, where the indication information includes QCL association information and first time window information. The measurement module is configured to measure, according to the indication information, a large-scale property parameter of a first reference signal.

An embodiment of the present application provides a large-scale property parameter measurement apparatus. The apparatus includes a configuration module and a sending module.

The configuration module is configured to configure indication information. The sending module is configured to send the indication information. The indication information includes QCL association information and first time window information.

An embodiment of the present application provides a communication node including a processor. The processor executes a computer program to perform the large-scale property parameter measurement method provided in the embodiment of the present application.

An embodiment of the present application provides a read-write storage medium used for computer storage. The storage medium stores one or more programs executable by one or more processors to implement the large-scale property parameter measurement method provided in the embodiment of the present application.

The embodiments of the present application provide a large-scale property parameter measurement method and apparatus, a node and a storage medium. The method includes acquiring indication information which includes QCL association information and first time window information and measuring a large-scale property parameter of a first reference signal according to the indication information. In the preceding process, the large-scale property parameter of a first reference signal can be measured according to QCL association information within a time range defined by first time window information included in the acquired indication information.

DETAILED DESCRIPTION

Figure 1:
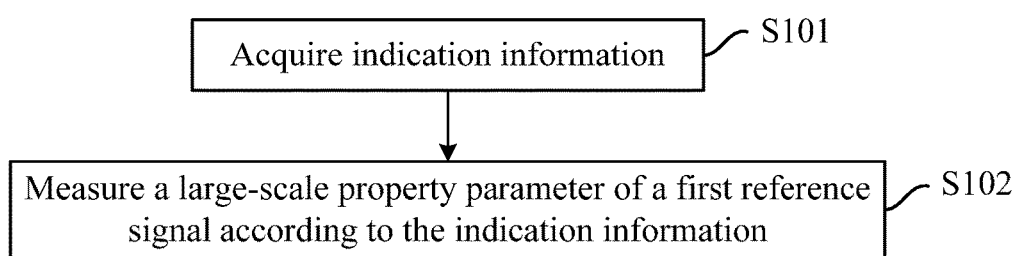
FIG. 1 is a flowchart of a large-scale property parameter measurement method according to an embodiment of the present application.

Embodiments of the present application are described hereinafter in conjunction with drawings.

In addition, in the embodiments of the present application, words such as "optionally" or "exemplarily" are used for representing examples, illustrations, or descriptions. Any embodiment or design described as "optional" or "exemplary" in embodiments of the present application should not be construed as being more preferred or advantageous than other embodiments or designs. Rather, the use of the words "optionally" or "exemplary" is intended to present related concepts in manners.

In the embodiments of the present application, "first" and "second" do not indicate a strict sequence and are merely used to distinguish between different reference signals.

To facilitate understanding of the solutions provided in the embodiments of the present application, the related concepts involved in the embodiments of the present application are construed below.

The demodulation reference signal (DMRS), channel state information reference signal (CSI-RS), phase tracking reference signal (PTRS), and synchronization signal/physical broadcast channel block (SSB) are defined in NR. These different reference signals have different uses. For example, the DMRS may be used for demodulating a physical downlink shared channel (PDSCH) and a physical downlink control channel (PDCCH), a CSI-RS for tracking may be used for detecting and adjusting a time-frequency offset, a CSI-RS for Layer 1 reference signal received power computation (CSI-RS for L1-RSRP computation) is used for beam management, a CSI-RS for mobility is used for mobility management, a CSI-RS for CSI acquisition is used for channel state information (CSI) acquisition, the PTRS is used for phase noise estimation, and the SSB is used for synchronization. Different reference signals are emitted from different antenna ports. Although different reference signals may be emitted by different transmit antennas, these different reference signals may have the same large-scale properties. For example, different antennas of one station may have the same or similar large-scale property parameters such as Doppler shift, Doppler spread, average delay, delay spread, Spatial Rx parameter, and the like. For the receive antennas of the same UE to receive reference signals from different transmit antennas of the same AP, at least the same or similar average delay may be assumed. In this case, the channel estimation accuracy on the receiving side can be improved. When two different antenna ports have the same large-scale property parameters, the two ports are quasi co-located. Such QCL associates reference signals sent from the different antenna ports.

Four different QCL types described below are defined in the NR protocol:

QCL Type A: {Doppler shift, Doppler spread, average delay, delay spread}

QCL Type B: {Doppler shift, Doppler spread}

QCL Type C: {Doppler shift, average delay}

QCL Type D: {Spatial Rx parameter}

Different QCL types correspond to different sets of large-scale property parameters. Each QCL type indicates large-scale property parameters that may be shared by different reference signals. If a DMRS of PDSCH and an SSB have a QCL type A relationship, the DMRS of PDSCH and the SSB have the same Doppler shift, Doppler spread, average delay, and delay spread, and when the DMRS is demodulated, the Doppler shift, Doppler spread, average delay, and delay spread of the SSB may be used.

Dense multiple-input multiple-output (dense MIMO), distributed multiple-input multiple-output (distributed MIMO), cell-free massive multiple-input multiple-output (cell-free massive MIMO) as the potential key technical points in the multi-antenna direction of the beyond fifth generation (B5G)/6th generation (6G) mobile communication system receive more and more attention. One feature of such technology is as follows: The spatial distribution of access points in a given area is more dispersed than that of centralized APs currently used in the NR; the number of APs is relatively large; multiple APs serve multiple pieces of UE simultaneously, and in this case, when a UE moves in the area or an AP/UE joins/exits cooperative transmission, the serving AP set of a specific UE may change, so that the interference situation changes, and the corresponding demodulation reference signal needs to be adjusted. For example, a base station indicates that the first reference signal and the second reference signal meet the QCL relationship, but correct demodulation of the second reference signal cannot be ensured according to the assumed QCL relationship between the first reference signal and the second reference signal. If the large-scale property parameter of the first reference signal is to be used by the second reference signal according to the QCL relationship, it is necessary to ensure that the large-scale property parameter of the first reference signal is measured accurate enough. In addition, different large-scale property parameters have different sensitivity to time changes. Therefore, there is no solution to the preceding problem.

Based on the preceding problem concepts and existing defects, an embodiment of the present application provides a large-scale property parameter measurement method. The method may be applied to a first node (e.g., a UE, a terminal, etc.). As shown in FIG. 1, the method may include, but is not limited to, the steps described below.

In S101, indication information is acquired.

Exemplarily, the indication information may include QCL association information and first time window information which are issued by a base station side; the QCL association information may include a QCL type and a first reference signal which has a QCL relationship with a second reference signal.

The QCL type may include at least one of QCL type A, QCL type B, QCL type C, or QCL type D.

The first time window information may be understood as a time range of a time domain portion during which a time domain interval occupied by the first reference signal coincides with a time range designated for the first time window.

The first reference signal may be understood as a source signal. The second reference signal may be understood as a target signal. That is, the large-scale property parameter measurement result of the first reference signal may be referred to for the second reference signal according to the QCL relationship between the second reference signal and the first reference signal.

In S102, a large-scale property parameter of a first reference signal is measured according to the indication information.

Since the indication information issued by the base station includes the QCL association information and the first time window information, the first node may measure the large-scale property parameter of the first reference signal according to the QCL association relationship information within the time range defined by the first time window information according to the acquired indication information.

The embodiment of the present application provides the large-scale property parameter measurement method. The method may include acquiring the indication information which includes the QCL association information and the first time window information and measuring the large-scale property parameter of the first reference signal according to the indication information. In the preceding process, the large-scale property parameter of the first reference signal can be measured according to the QCL association information within the time range defined by the first time window information included in the acquired indication information.

Optionally, the second reference signal may include any one of a DMRS, a CSI-RS, or a PTRS; the first reference signal may include any one of an SSB, a CSI-RS, or a DMRS.

In one embodiment, the first time window information includes a first time reference point and a first window length. The first time reference point may be understood as including a time point at which signaling indicating that the first reference signal has a QCL relationship with a second reference signal is received, or as a time point at which a large-scale property parameter of a second reference signal is determined.

The first window length may be in units of symbols, slots, subframes, frames, seconds, milliseconds, microseconds, or the like, or may be the number of symbols, the number of slots, the number of subframes, or the number of frames occupied by the first reference signal from the first time reference point.

The first window length may include a specifically configured window length or differently configured window lengths.

The specifically configured window length may be understood as that a uniform first window length may be configured for different QCL types, different first reference signals, different second reference signals, and different large-scale property parameters.

In the case where the first window length includes differently configured window lengths, different configurations in different scenarios may be implemented. For example, the different configurations of the first window length may include at least one of the cases described below.

The first window lengths may be configured differently according to different large-scale property parameters. For example, Doppler shift, Doppler spread, average delay, delay spread, and Spatial Rx parameter each are configured with a different first window length. Alternatively, different large-scale property parameters may be combined, the large-scale property parameters in the same group have the same first window length, and large-scale property parameters between different groups have different first window lengths. For example, the large-scale property parameters may be divided into three groups in a division manner of {Doppler shift, Doppler spread}, {average delay, delay spread}, and {Spatial Rx parameter}, and these three groups are configured with three different first window lengths, respectively.

The first window lengths of the different large-scale property parameters or the first window lengths of the different groups of large-scale property parameters may meet a certain quantity relationship. For example, the first window lengths of Doppler shift, Doppler spread, average delay, delay spread, and Spatial Rx parameter may be tw_base, 2*tw_base, 3*tw_base, 4*tw_base, and 5*tw_base, respectively, or may be tw_base, 2*tw_base, 4*tw_base, 6*tw_base, and 8*tw_base, respectively.

Similarly, the first window lengths of the three groups of {Doppler shift, Doppler spread}, {average delay, delay spread}, and {Spatial Rx parameter} may be tw_base, 2*tw_base, and 3*tw_base, respectively, or may be tw_base, 2*tw_base, and 4*tw_base, respectively.

The preceding tw_base is the baseline window length, and different first window lengths may be configured through configuring the baseline window length with different scaling factors.

The first window lengths may further be differently configured according to different QCL types. For example, QCL type A, QCL type B, QCL type C, and QCL type D each are configured with a different first window length; alternatively, different QCL types may be grouped, large-scale property parameters in the same group have the same first window length, and large-scale property parameters between different groups have different first window lengths. For example, the large-scale property parameters may be divided into three groups in a manner of {QCL type A, QCL type D}, {QCL type B}, and {QCL type C}, and these three groups are configured with three different first window lengths, respectively.

Optionally, the first window lengths of the different QCL types or the first window lengths of the different groups of QCL types may meet a certain quantity relationship. For example, the first window lengths of QCL type A, QCL type B, QCL type C, and QCL type D may be tw_base, 2*tw_base, 3*tw_base, and 4*tw_base, respectively, or may be tw_base, 3*tw_base, 4*tw_base, and 8*tw_base, respectively.

Similarly, the first window lengths of the three groups of {QCL type A, QCL type D}, {QCL type B}, and {QCL type C} may be tw_base, 2*tw_base, and 3*tw_base, respectively, or may be tw_base, 2*tw_base, and 4*tw_base, respectively.

The preceding tw_base is the baseline window length, and different first window lengths may be configured through configuring the baseline window length with different scaling factors.

Optionally, the first window lengths may further be configured differently according to first reference signals having different uses or functions. For example, a CSI-RS for tracking, a CSI-RS for L1-RSRP computation, a CSI-RS for CSI acquisition, a DMRS and an SSB each are configured with a different first window length; alternatively, reference signals having different uses may be grouped, large-scale property parameters in the same group have the same first window length, and large-scale property parameters between different groups have different first window lengths. For example, the first reference signals may be divided into two groups in a manner of {CSI-RS for tracking, CSI-RS for L1-RSRP computation, CSI-RS for CSI acquisition} and {SSB, DMRS}, and these two groups are configured with two different window lengths, respectively.

The first window lengths of the first reference signals having different functions or the first window lengths of the groups of first reference signals having different functions may meet a certain quantity relationship. For example, the first window lengths of the CSI-RS for tracking, CSI-RS for L1-RSRP computation, CSI-RS for CSI acquisition, DMRS, and SSB may be tw_base, 2*tw_base, 3*tw_base, 4*tw_base, and 5*tw_base, respectively, or may be tw_base, 3*tw_base, 8*tw_base, 10*tw_base, and 12*tw_base, respectively.

Similarly, the first window lengths of the two groups of {CSI-RS for tracking, CSI-RS for L1-RSRP computation, CSI-RS for CSI acquisition} and {SSB, DMRS} may be tw_base and 2*tw_base, respectively, or may be tw_base and 4*tw_base, respectively.

The preceding tw_base is the baseline window length, and different first window lengths may be configured through configuring the baseline window length with different scaling factors.

Optionally, the first window lengths may further be configured differently according to second reference signals having different uses or functions. For example, a DMRS of PDSCH, a DMRS of PDCCH, a CSI-RS for tracking, a CSI-RS for L1-RSRP computation, a CSI-RS for mobility, a CSI-RS for CSI acquisition, and a PTRS each are configured with a different first window length; alternatively, second reference signals having different functions may be grouped, large-scale property parameters in the same group have the same first window length, and large-scale property parameters between different groups have different first window lengths. For example, the second reference signals may be divided into three groups according to {DMRS of PDSCH, DMRS of PDCCH}, {CSI-RS for tracking, CSI-RS for L1-RSRP computation, CSI-RS for mobility, CSI-RS for CSI acquisition}, and {PTRS}, and these three groups are configured with three different first window lengths, respectively.

The first window lengths of the second reference signals having different functions or the first window lengths of the groups of second reference signals having different functions may meet a certain quantity relationship. For example, the first window lengths of the DMRS of PDSCH, DMRS of PDCCH, CSI-RS for tracking, CSI-RS for L1-RSRP computation, CSI-RS for mobility, CSI-RS for CSI acquisition, and PTRS may be tw_base, 2*tw_base, 3*tw_base, 4*tw_base, 5*tw_base, 6*tw_base, and 7*tw_base, respectively, or may be tw_base, 2*tw_base, 4*tw_base, 6*tw_base, 8*tw_base, 10*tw_base, and 12*tw_base, respectively.

Similarly, the first window lengths of the three groups of {DMRS of PDSCH, DMRS of PDCCH}, {CSI-RS for tracking, CSI-RS for L1-RSRP computation, CSI-RS for mobility, CSI-RS for CSI acquisition}, and {PTRS} may be tw_base, 2*tw_base, and 3*tw_base, respectively, or may be tw_base, 2*tw_base, and 4*tw_base, respectively.

The preceding tw_base is the baseline window length, and different first window lengths may be configured through configuring the baseline window length with different scaling factors.

In one embodiment, the first window lengths may further be differently configured according to periodic properties of different first reference signals. For example, a periodic CSI-RS, an SSB, and an aperiodic CSI-RS each are configured with a different first window length; alternatively, the first reference signals may be grouped according to periodic differences, the large-scale property parameters of the first reference signals in the same group have the same first window length, and the large-scale property parameters of the first reference signals between different groups have different first window lengths. For example, the first reference signals may be divided into two groups in a manner of {periodic CSI-RS, SSB} and {aperiodic CSI-RS}, and these two groups are configured with two different first window lengths, respectively.

The first window lengths of the first reference signals having different periodic properties or the first window lengths of the first reference signals in different periodic property groups may meet a certain quantity relationship. For example, the first window lengths of the periodic CSI-RS, SSB, and aperiodic CSI-RS may be tw_base, 2*tw_base, and 3*tw_base, respectively, or may be tw_base, 2*tw_base, and 4*tw_base, respectively.

Similarly, the first window lengths of the two groups of {periodic CSI-RS, SSB}, and {aperiodic CSI-RS} may be tw_base and 2*tw_base, respectively, or may be tw_base and 4*tw_base, respectively.

The preceding tw_base is the baseline window length, and different first window lengths may be configured through configuring the baseline window length with different scaling factors.

Optionally, the first window lengths may further be differently configured according to periodicity of different second reference signals. For example, a periodic CSI-RS, an aperiodic CSI-RS, a DMRS and a PTRS each are configured with a different first window length; alternatively, the second reference signals may be grouped according to periodic differences, the large-scale property parameters of the second reference signals in the same group have the same first window length, and the large-scale property parameters of the second reference signals between different groups have different first window lengths. For example, the groups may be {periodic CSI-RS} and {aperiodic CSI-RS, DMRS, PTRS}, and these two groups are configured with two different first window lengths, respectively.

The first window lengths of the second reference signals having different periodic properties or the first window lengths of second reference signals in different periodic property groups may meet a certain quantity relationship. For example, the first window lengths of the periodic CSI-RS, aperiodic CSI-RS, DMRS and PTRS may be tw_base, 2*tw_base, 3*tw_base, and 4*tw_base, respectively, or may be tw_base, 2*tw_base, 4*tw_base, and 8*tw_base, respectively.

Similarly, the first window lengths of the two groups of {periodic CSI-RS}, and {aperiodic CSI-RS, DMRS, PTRS} may be tw_base and 2*tw_base, respectively, or may be tw_base and *tw_base, respectively.

The preceding tw_base is the baseline window length, and different first window lengths may be configured through configuring the baseline window length with different scaling factors.

That is, the differently configured window lengths may be in a functional relationship with at least one of the large-scale property parameter, the QCL type, the function of the second reference signal, the function of the first reference signal, the periodic property of the first reference signal, or the periodic property of the second reference signal. Such functional relationship may include a positive correlation or a negative correlation. The periodic properties herein may include being periodic or aperiodic, that is, the differently configured window lengths may be understood as that different window lengths are respectively associated with a periodic reference signal and an aperiodic reference signal.

In one embodiment, the step S102 in which the large-scale property parameter of the first reference signal is measured according to the indication information may include measuring the large-scale property parameter of the first reference signal according to a time domain portion during which a time domain interval occupied by the first reference signal coincides with a time range designated for the first time window.

For example, the time domain occupied by the first reference signal is within the time range designated by the first time window information, and then the large-scale property parameter of the first reference signal may be measured according to the time domain interval occupied by the first reference signal.

Figure 2:
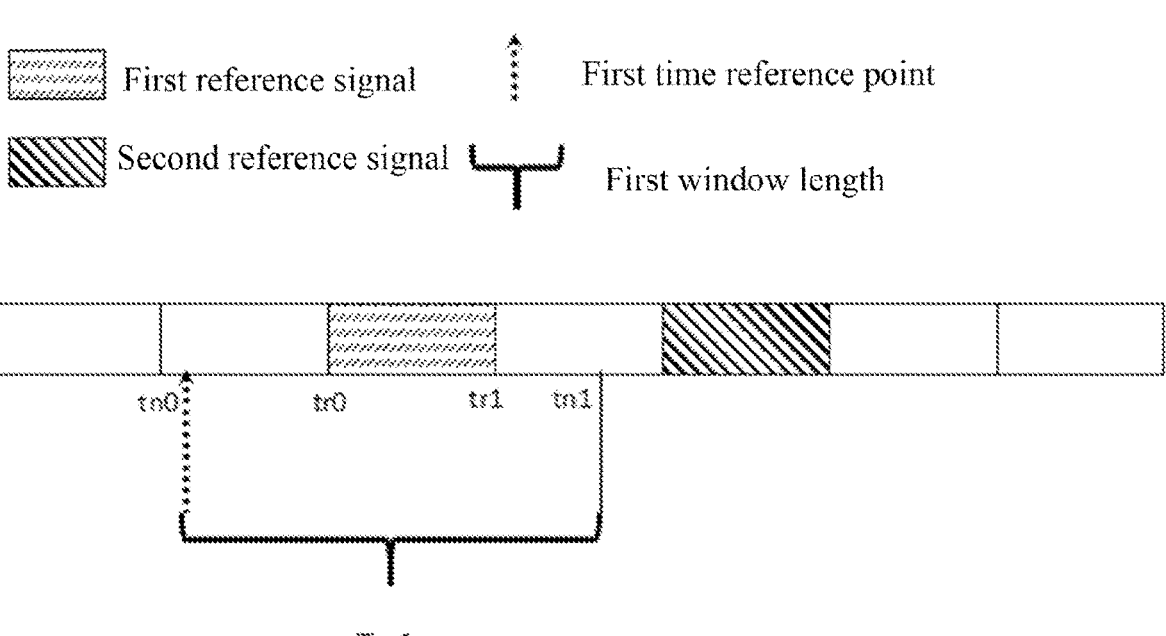
FIG. 2 is a diagram of a time range for measuring a large-scale property parameter of a first parameter signal according to an embodiment of the present application.

As shown in FIG. 2, it is assumed that the first time reference point is tn0, the first window length is Tw1, the time range of the first time window is from tn0 to tn1, and the time range of the first reference signal is from tr0 to tr1. The time domain interval of the first reference signal is within the time range designated by the first time window information, and then the time range for measuring the large-scale property parameter of the first parameter signal is from tr0 to tr1.

Figure 3:
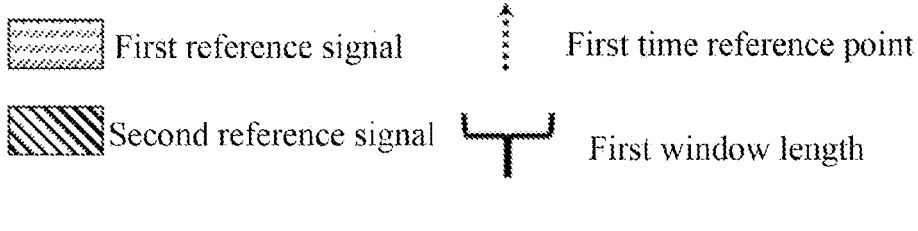
FIG. 3 is a diagram of another time range for measuring a large-scale property parameter of a first parameter signal according to an embodiment of the present application.
Figure 3:
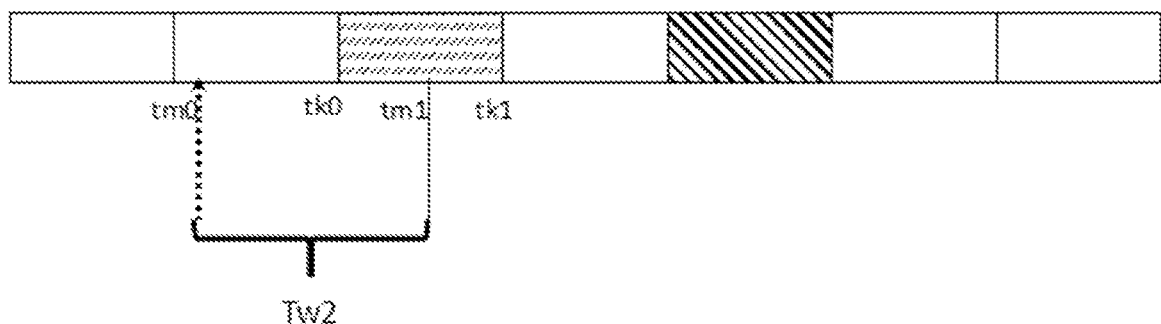

If merely part of the time domain occupied by the first reference signal is within the time range designated by the first time window information, as shown in FIG. 3, assuming that the first time reference point is tm0, the first window length is Tw2, the time range designated by the first time window information is from tm0 to tm1, and the time range of the first reference signal is from tk0 to tk1, the time range for measuring the large-scale property parameter of the first reference signal is from tk0 to tm1.

Figure 4:
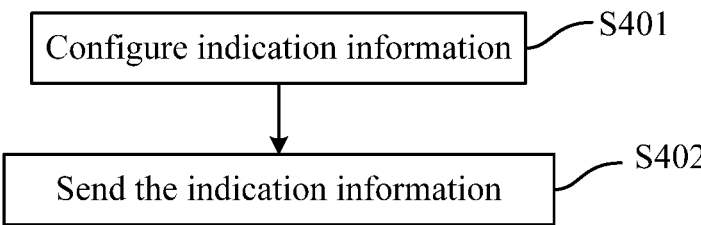
FIG. 4 is a flowchart of a large-scale property parameter measurement method according to an embodiment of the present application.

FIG. 4 is a flowchart of a large-scale property parameter measurement method according to an embodiment of the present application. The method may be applied to a second node (e.g., a base station). As shown in FIG. 4, the method may include, but is not limited to, the steps described below.

In S401, indication information is configured.

Exemplarily, in the embodiment of the present application, the second node may configure the indication information in a manner of static configuration, or the base station may indicate a first window length in a manner of dynamic signaling after configuring a set of parameters, or the base station may jointly determine a first window length in the indication information with the first node after configuring a set of parameters.

In S402, the indication information is sent.

The indication information sent by the second node may include QCL association information and first time window information which includes the first window length.

The QCL association information may include a QCL type and a first reference signal which has a QCL relationship with a second reference signal. The QCL type may include at least one of QCL type A, QCL type B, QCL type C, or QCL type D. The first reference signal may be understood as a source signal. The second reference signal may be understood as a target signal. That is, the large-scale property parameter measurement result of the first reference signal may be referred to for the second reference signal according to the QCL relationship between the second reference signal and the first reference signal.

The first time window information may be understood as a time range of a time domain portion during which a time domain interval occupied by the first reference signal coincides with a time range designated for the first time window. The first time window may further include a first time reference point. The first time reference point may be understood as including a time point at which signaling indicating that the first reference signal has a QCL relationship with a second reference signal is received, or as a time point at which a large-scale property parameter of a second reference signal is determined.

The embodiment of the present application provides the large-scale property parameter measurement method. The method may include configuring the first window length and sending the first window length through the indication information. The indication information includes QCL association information and first time window information which includes the first window length. In the preceding process, the large-scale property parameter of a first reference signal can be measured according to QCL association information within a time range defined by the first time window information included in the issued indication information.

Exemplarily, the first reference signal may include any one of an SSB, a CSI-RS, or a DMRS; the second reference signal may include any one of a DMRS, a CSI-RS, or a PTRS.

Optionally, the first window length may be in units of symbols, slots, subframes, frames, seconds, milliseconds, microseconds, or the like, or may be the number of symbols, the number of slots, the number of subframes, or the number of frames occupied by the first reference signal from the first time reference point.

In one embodiment, the first window length may include a specifically configured window length or differently configured window lengths.

In the case where the first window length includes differently configured window lengths, different configurations in different scenarios may be implemented. For example, the different configurations of the first window length may include at least one of the cases described below.

The first window lengths may be configured differently according to different large-scale property parameters. For example, Doppler shift, Doppler spread, average delay, delay spread, and Spatial Rx parameter each are configured with a different first window length. Alternatively, different large-scale property parameters may be combined, the large-scale property parameters in the same group have the same first window length, and large-scale property parameters between different groups have different first window lengths. For example, the large-scale property parameters may be divided into three groups in a division manner of {Doppler shift, Doppler spread}, {average delay, delay spread}, and {Spatial Rx parameter}, and these three groups are configured with three different first window lengths, respectively.

The first window lengths of the different large-scale property parameters or the first window lengths of the different groups of large-scale property parameters may meet a certain quantity relationship. For example, the first window lengths of Doppler shift, Doppler spread, average delay, delay spread, and Spatial Rx parameter may be tw_base, 2*tw_base, 3*tw_base, 4*tw_base, and 5*tw_base, respectively, or may be tw_base, 2*tw_base, 4*tw_base, 6*tw_base, and 8*tw_base, respectively.

Similarly, the first window lengths of the three groups of {Doppler shift, Doppler spread}, {average delay, delay spread}, and {Spatial Rx parameter} may be tw_base, 2*tw_base, and 3*tw_base, respectively, or may be tw_base, 2*tw_base, and 4*tw_base, respectively.

The preceding tw_base is the baseline window length, and different first window lengths may be configured through configuring the baseline window length with different scaling factors.

Figure 5:
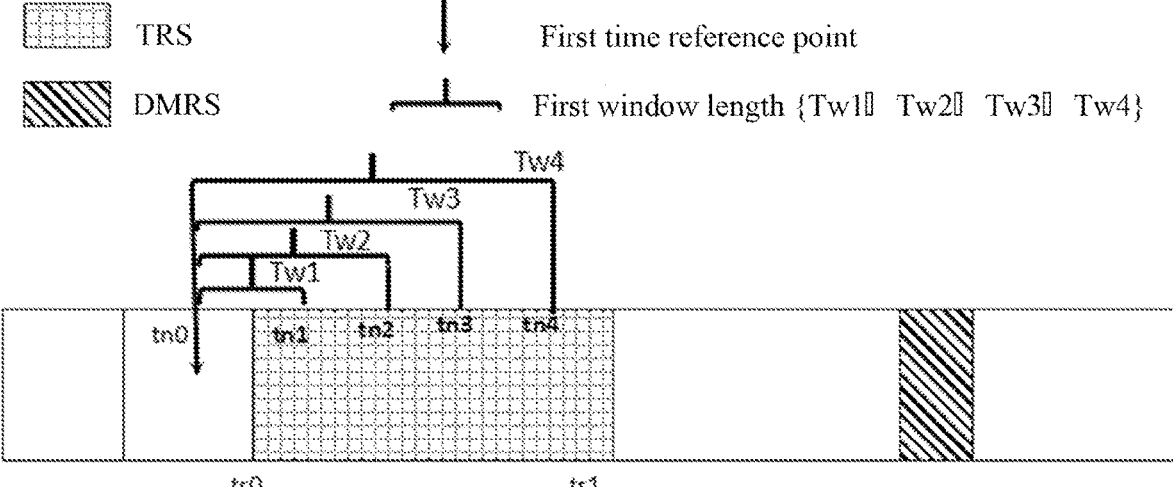
FIG. 5 is a diagram in which different first window lengths are configured for different large-scale property parameters according to an embodiment of the present application.

As shown in FIG. 5, it is assumed that the second node indicates that the DMRS (set as the second reference signal) and the aperiodic CSI-RS for tracking (TRS) (set as the first reference signal) meet the QCL type A relationship, the first window lengths corresponding to Doppler shift, Doppler spread, average delay, and delay spread are respectively configured as Tw1, Tw2, Tw3, and Tw4, and Tw1<Tw2<Tw3<Tw4. The time range of the first reference signal is from tr0 to tr1, the first time reference point is tn0, and the four different time ranges designated by the first time window information are tn0 to tn1, tn0 to tn2, tn0 to tn3, and tn0 to tn4, respectively. Therefore, if the DMRS needs to use parameters such as Doppler shift, Doppler spread, average delay, and delay spread, the time ranges of the TRS may be referred to, that is, measurement is performed with reference to tr0 to tn1, tr0 to tn2, tr0 to tn3, and tr0 to tn4.

The first window lengths of the different large-scale property parameters are not necessarily in ascending order according to the order of Doppler shift, Doppler spread, average delay, and delay spread, and may be in descending order according to the order of Doppler spread, Doppler shift, delay spread, and average delay, and may further be in other relationships. One example is merely given herein.

Optionally, the first window lengths may further be differently configured according to different QCL types. For example, QCL type A, QCL type B, QCL type C, and QCL type D each are configured with a different first window length; alternatively, different QCL types may be grouped, large-scale property parameters in the same group have the same first window length, and different groups have different first window lengths. For example, the large-scale property parameters may be divided into three groups in a manner of {QCL type A, QCL type D}, {QCL type B}, and {QCL type C}, and these three groups are configured with three different first window lengths, respectively.

Optionally, the first window lengths of the different QCL types or the first window lengths of the different groups of QCL types may meet a certain quantity relationship. For example, the first window lengths of QCL type A, QCL type B, QCL type C, and QCL type D may be tw_base, 2*tw_base, 3*tw_base, and 4*tw_base, respectively, or may be tw_base, 3*tw_base, 4*tw_base, and 8*tw_base, respectively.

Similarly, the first window lengths of the three groups of {QCL type A, QCL type D}, {QCL type B}, and {QCL type C} may be tw_base, 2*tw_base, and 3*tw_base, respectively, or may be tw_base, 2*tw_base, and 4*tw_base, respectively.

The preceding tw_base is the baseline window length, and different first window lengths may be configured through configuring the baseline window length with different scaling factors.

Optionally, the first window lengths may further be configured differently according to first reference signals having different uses or functions. For example, a CSI-RS for tracking, a CSI-RS for L1-RSRP computation, a CSI-RS for CSI acquisition, a DMRS and an SSB each are configured with a different first window length; alternatively, reference signals having different uses may be grouped, large-scale property parameters in the same group have the same first window length, and large-scale property parameters between different groups have different first window lengths. For example, the first reference signals may be divided into two groups in a manner of {CSI-RS for tracking, CSI-RS for L1-RSRP computation, CSI-RS for CSI acquisition} and {SSB, DMRS}, and these two groups are configured with two different window lengths, respectively.

The first window lengths of the first reference signals having different functions or the first window lengths of the groups of first reference signals having different functions may meet a certain quantity relationship. For example, the first window lengths of the CSI-RS for tracking, CSI-RS for L1-RSRP computation, CSI-RS for CSI acquisition, DMRS, and SSB may be tw_base, 2*tw_base, 3*tw_base, 4*tw_base, and 5*tw_base, respectively, or may be tw_base, 3*tw_base, 8*tw_base, 10*tw_base, and 12*tw_base, respectively.

Similarly, the first window lengths of the two groups of {CSI-RS for tracking, CSI-RS for L1-RSRP computation, CSI-RS for CSI acquisition} and {SSB, DMRS} may be tw_base and 2*tw_base, respectively, or may be tw_base and 4*tw_base, respectively.

The preceding tw_base is the baseline window length, and different first window lengths may be configured through configuring the baseline window length with different scaling factors.

Optionally, the first window lengths may further be configured differently according to second reference signals having different uses or functions. For example, a DMRS of PDSCH, a DMRS of PDCCH, a CSI-RS for tracking, a CSI-RS for L1-RSRP computation, a CSI-RS for mobility, a CSI-RS for CSI acquisition, and a PTRS each are configured with a different first window length; alternatively, second reference signals having different functions may be grouped, large-scale property parameters in the same group have the same first window length, and large-scale property parameters between different groups have different first window lengths. For example, the second reference signals may be divided into three groups according to {DMRS of PDSCH, DMRS of PDCCH}, {CSI-RS for tracking, CSI-RS for L1-RSRP computation, CSI-RS for mobility, CSI-RS for CSI acquisition}, and {PTRS}, and these three groups are configured with three different first window lengths, respectively.

The first window lengths of the second reference signals having different functions or the first window lengths of the groups of second reference signals having different functions may meet a certain quantity relationship. For example, the first window lengths of the DMRS of PDSCH, DMRS of PDCCH, CSI-RS for tracking, CSI-RS for L1-RSRP computation, CSI-RS for mobility, CSI-RS for CSI acquisition, and PTRS may be tw_base, 2*tw_base, 3*tw_base, 4*tw_base, 5*tw_base, 6*tw_base, and 7*tw_base, respectively, or may be tw_base, 2*tw_base, 4*tw_base, 6*tw_base, 8*tw_base, 10*tw_base, and 12*tw_base, respectively.

Similarly, the first window lengths of the three groups of {DMRS of PDSCH, DMRS of PDCCH}, {CSI-RS for tracking, CSI-RS for L1-RSRP computation, CSI-RS for mobility, CSI-RS for CSI acquisition}, and {PTRS} may be tw_base, 2*tw_base, and 3*tw_base, respectively, or may be tw_base, 2*tw_base, and 4*tw_base, respectively.

The preceding tw_base is the baseline window length, and different first window lengths may be configured through configuring the baseline window length with different scaling factors.

In one embodiment, the first window lengths may further be differently configured according to periodic properties of different first reference signals. For example, a periodic CSI-RS, an SSB, and an aperiodic CSI-RS each are configured with a different first window length; alternatively, the first reference signals may be grouped according to periodic differences, the large-scale property parameters of the first reference signals in the same group have the same first window length, and the large-scale property parameters of the first reference signals between different groups have different first window lengths. For example, the first reference signals may be divided into two groups in a manner of {periodic CSI-RS, SSB} and {aperiodic CSI-RS}, and these two groups are configured with two different first window lengths, respectively.

The first window lengths of the first reference signals having different periodic properties or the first window lengths of first reference signals in different periodic property groups may meet a certain quantity relationship. For example, the first window lengths of the periodic CSI-RS, SSB, and aperiodic CSI-RS may be tw_base, 2*tw_base, and 3*tw_base, respectively, or may be tw_base, 2*tw_base, and 4*tw_base, respectively.

Similarly, the first window lengths of the two groups of {periodic CSI-RS, SSB}, and {aperiodic CSI-RS} may be tw_base and 2*tw_base, respectively, or may be tw_base and 4*tw_base, respectively.

The preceding tw_base is the baseline window length, and different first window lengths may be configured through configuring the baseline window length with different scaling factors.

Optionally, the first window lengths may further be differently configured according to periodicity of different second reference signals. For example, a periodic CSI-RS, an aperiodic CSI-RS, a DMRS and a PTRS each are configured with a different first window length; alternatively, the second reference signals may be grouped according to periodic differences, the large-scale property parameters of the second reference signals in the same group have the same first window length, and the large-scale property parameters of the second reference signals between different groups have different first window lengths. For example, the groups may be {periodic CSI-RS} and {aperiodic CSI-RS, DMRS, PTRS}, and these two groups are configured with two different first window lengths, respectively.

The first window lengths of the second reference signals having different periodic properties or the first window lengths of the second reference signals in different periodic property groups may meet a certain quantity relationship. For example, the first window lengths of the periodic CSI-RS, aperiodic CSI-RS, DMRS and PTRS may be tw_base, 2*tw_base, 3*tw_base, and 4*tw_base, respectively, or may be tw_base, 2*tw_base, 4*tw_base, and 8*tw_base, respectively.

Similarly, the first window lengths of the two groups of {periodic CSI-RS} and {aperiodic CSI-RS, DMRS, PTRS} may be tw_base and 2*tw_base, respectively, or may be tw_base and *tw_base, respectively.

The preceding tw_base is the baseline window length, and different first window lengths may be configured through configuring the baseline window length with different scaling factors.

The preceding quantity relationship may be understood as a functional relationship. That is, the differently configured window lengths may be in a functional relationship with at least one of the large-scale property parameter, the QCL type, the function of the second reference signal, the function of the first reference signal, the periodic property of the first reference signal, or the periodic property of the second reference signal. The periodic properties may include being periodic or aperiodic.

Figure 6:
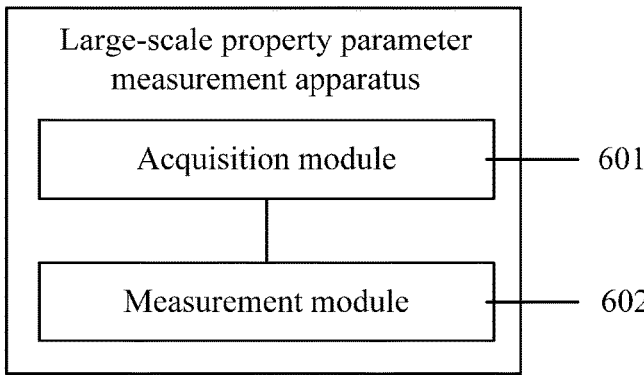
FIG. 6 is a diagram of a large-scale property parameter measurement apparatus according to an embodiment of the present application.

FIG. 6 is a diagram of a large-scale property parameter measurement apparatus according to an embodiment of the present application. As shown in FIG. 6, the apparatus may include an acquisition module 601 and a measurement module 602. The acquisition module 601 is configured to acquire indication information. The indication information includes QCL association information and first time window information. The measurement module 602 is configured to measure, according to the indication information, a large-scale property parameter of a first reference signal.

Exemplarily, the QCL association information may include a QCL type and a first reference signal which has a QCL relationship with a second reference signal. The QCL type may include at least one of QCL type A, QCL type B, QCL type C, or QCL type D.

Optionally, the second reference signal may include any one of a DMRS, a CSI-RS, or a PTRS; the first reference signal may include any one of an SSB, a CSI-RS, or a DMRS.

In one example, the first time window information includes a first time reference point and a first window length; the first window length includes a specifically configured window length or differently configured window lengths.

Exemplarily, the differently configured window lengths may include at least one of the following: the window lengths differently configured according to the large-scale property parameters; the window lengths differently configured according to different QCL types; the window lengths differently configured according to the functions of the second reference signal; the window lengths differently configured according to the functions of the first reference signal; the window lengths differently configured according to the periodic properties of the first reference signal; or the window lengths differently configured according to the periodic properties of the second reference signal.

In one embodiment, the measurement module 602 may be configured to measure the large-scale property parameter of the first reference signal according to a time domain portion during which a time domain interval occupied by the first reference signal coincides with a time range designated for the first time window.

The large-scale property parameter measurement apparatus provided in this embodiment is used for implementing the large-scale property parameter measurement method provided in the embodiment shown in FIG. 1. The apparatus and the method have similar implementation principles and technical effects. Details are not described herein again.

Figure 7:
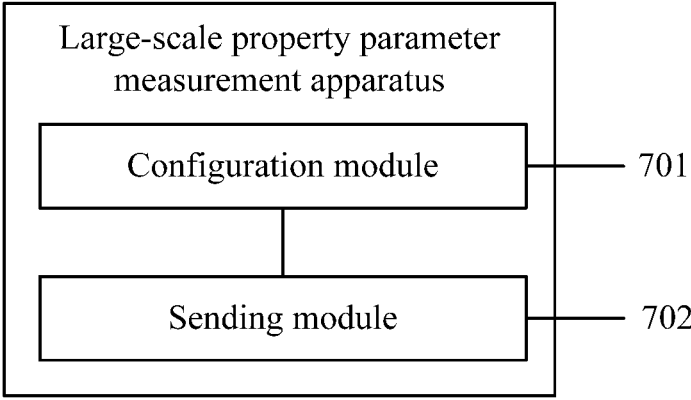
FIG. 7 is a diagram of another large-scale property parameter measurement apparatus according to an embodiment of the present application.

FIG. 7 is a diagram of another large-scale property parameter measurement apparatus according to an embodiment of the present application. As shown in FIG. 7, the apparatus may include a configuration module 701 and a sending module 702. The configuration module 701 is configured to configure indication information. The sending module 702 is configured to send the indication information. The indication information includes QCL association information and first time window information which includes a first window length.

The QCL association information may include a QCL type and a first reference signal which has a QCL relationship with a second reference signal. The QCL type may include at least one of QCL type A, QCL type B, QCL type C, or QCL type D.

Optionally, the second reference signal may include any one of a DMRS, a CSI-RS, or a PTRS; the first reference signal may include any one of an SSB, a CSI-RS, or a DMRS.

Optionally, the first time window information includes a first time reference point and a first window length; the first window length may include a specifically configured window length or differently configured window lengths.

Exemplarily, the differently configured window lengths may include at least one of the following: the window lengths differently configured according to the large-scale property parameters; the window lengths differently configured according to different QCL types; the window lengths differently configured according to the functions of the second reference signal; the window lengths differently configured according to the functions of the first reference signal; the window lengths differently configured according to the periodic properties of the first reference signal; or the window lengths differently configured according to the periodic properties of the second reference signal.

The large-scale property parameter measurement apparatus provided in this embodiment is used for implementing the large-scale property parameter measurement method provided in the embodiment shown in FIG. 4. The apparatus and the method have similar implementation principles and technical effects. Details are not described herein again.

Figure 8:
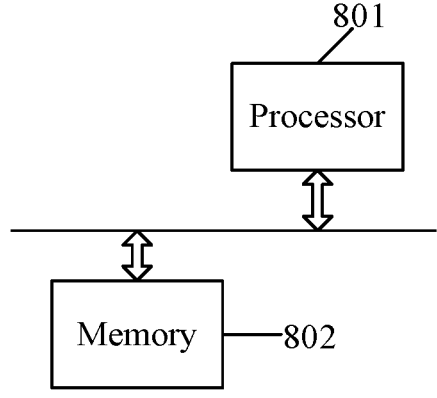
FIG. 8 is a diagram illustrating the structure of a communication node according to an embodiment of the present application.

FIG. 8 is a diagram illustrating the structure of a communication node according to an embodiment of the present application. As shown in FIG. 8, the node includes a processor 801 and a memory 802. The number of processors 801 in the node may be one or more, and one processor 801 is used as an example in FIG. 8. The processor 801 and the memory 802 in the node may be connected through a bus or in other manners. In FIG. 8, the connection through the bus is used as an example.

As a computer-readable storage medium, the memory 802 may be configured to store software programs, computer-executable programs and modules, such as program instructions/modules (for example, the acquisition module 601 and the measurement module 602 in the large-scale property parameter measurement apparatus or the configuration module 701 and the sending module 702 in the large-scale property parameter measurement apparatus) corresponding to the large-scale property parameter measurement method provided in the embodiment shown in FIG. 1 or FIG. 4. The processor 801 performs the large-scale property parameter measurement method by running the software programs, instructions and modules stored in the memory 802.

The memory 802 may mainly include a program storage region and a data storage region. The program storage region may store an operating system and an application program required by at least one function. The data storage region may store data created according to the use of a set-top box. Additionally, the memory 802 may include a high-speed random-access memory and may also include a nonvolatile memory, such as at least one magnetic disk memory, a flash memory, or another nonvolatile solid-state memory.

In one embodiment, if possible, the processor in the preceding node may perform the preceding large-scale property parameter measurement method through a hardware circuit such as an internal logic circuit or a gate circuit.

An embodiment of the present application provides a storage medium configured for computer-readable and computer-writeable storage. The storage medium stores one or more programs executable by one or more processors to implement the large-scale property parameter measurement method provided in the embodiment of the present application.

It is to be understood by those of ordinary skill in the art that some or all steps in the preceding disclosed method and function modules/units in the device may be implemented as software, firmware, hardware and suitable combinations thereof.

In the hardware implementation, the division of the preceding function modules/units may not correspond to the division of physical components. For example, one physical component may have multiple functions, or one function or step may be performed jointly by several physical components. Some or all physical components are implementable as software executed by a processor such as a central processing unit, a digital signal processor, or a microprocessor, are implementable as hardware, or are implementable as integrated circuits such as application-specific integrated circuits. Such software may be distributed on computer-readable media. The computer-readable media may include computer storage media (or non-transitory media) and communication media (or transitory media). As known to those of ordinary skill in the art, the term computer storage media includes volatile and non-volatile as well as removable and non-removable media implemented in any method or technology for storing information (such as computer-readable instructions, data structures, program modules, or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, a magnetic disk or other magnetic storage devices, or any other medium that can be used for storing desired information and that can be accessed by a computer. Moreover, as known to those of ordinary skill in the art, the communication media generally include computer-readable instructions, data structures, program modules, or other data in carriers or in modulated data signals transported in other transport mechanisms and may include any information delivery medium.

What is claimed is:

1. A large-scale property parameter measurement method, applied to a first node and comprising:

acquiring indication information;

wherein the indication information comprises quasi co-location (QCL) association information and first time window information; and measuring a large-scale property parameter of a first reference signal according to the indication information;

wherein the first time window information comprises a first time reference point and a first window length;

wherein the first window length comprises a differently configured window length;

wherein the first time reference point comprises a time point at which signaling indicating that the first reference signal has a QCL relationship with a second reference signal is received, or the first time reference point comprises a time point at which a large-scale property parameter of a second reference signal is determined; and wherein measuring the large-scale property parameter of the first reference signal according to the indication information comprises: measuring the large-scale property parameter of the first reference signal according to a time domain portion during which a time domain interval occupied by the first reference signal coincides with a time range designated by the first time window information.

2. The method of claim 1, wherein the QCL association information comprises a QCL type and the first reference signal which has a QCL relationship with the second reference signal;

wherein the QCL type comprises at least one of QCL type A, QCL type B, QCL type C, or QCL type D.

3. The method of claim 2, wherein the second reference signal comprises one of a demodulation reference signal (DMRS), a channel state information reference signal (CSI-RS), or a phase tracking reference signal (PTRS); and the first reference signal comprises one of a synchronization signal/physical broadcast channel block (SSB), a CSI-RS, or a DMRS.

4. The method of claim 1, wherein the differently configured window length is in a functional relationship with at least one of following reference factors:

a large-scale property parameter, a QCL type, a function of the second reference signal, a function of the first reference signal, a periodic property of the first reference signal, or a periodic property of the second reference signal;

wherein the periodic property comprises being periodic or aperiodic.

5. A large-scale property parameter measurement method, applied to a second node and comprising:

configuring indication information; and sending the indication information;

wherein the indication information comprises quasi co-location (QCL) association information and first time window information:

wherein the first time window information comprises a first time reference point and a first window length;

wherein the first time reference point comprises a time point at which signaling indicating that a first reference signal has a QCL relationship with a second reference signal is received, or the first time reference point comprises a time point at which a large-scale property parameter of a second reference signal is determined;

wherein the first window length comprises a differently configured window length; and wherein the indication information is used to indicate a first node to measure a large-scale property parameter of the first reference signal according to a time domain portion during which a time domain interval occupied by the first reference signal coincides with a time range designated by the first time window information.

6. The method of claim 5, wherein the QCL association information comprises a QCL type and the first reference signal which has a QCL relationship with the second reference signal;

wherein the QCL type comprises at least one of QCL type A, QCL type B, QCL type C, or QCL type D.

7. The method of claim 6, wherein the second reference signal comprises one of a demodulation reference signal (DMRS), a channel state information reference signal (CSI-RS), or a phase tracking reference signal (PTRS); and the first reference signal comprises one of a synchronization signal/physical broadcast channel block (SSB), a CSI-RS, or a DMRS.

8. The method of claim 5, wherein the differently configured window length is in a functional relationship with at least one of following reference factors:

a large-scale property parameter, a QCL type, a function of the second reference signal, a function of the first reference signal, a periodic property of the first reference signal, or a periodic property of the second reference signal;

wherein the periodic property comprises being periodic or aperiodic.

9. A communication node, comprising a processor, wherein the processor executes a computer program to perform the following steps:

acquiring indication information;

wherein the indication information comprises quasi co-location (QCL) association information and first time window information; and measuring a large-scale property parameter of a first reference signal according to the indication information;

wherein the first time window information comprises a first time reference point and a first window length;

wherein the first window length comprises a differently configured window length:

wherein the first time reference point comprises a time point at which signaling indicating that the first reference signal has a QCL relationship with a second reference signal is received, or the first time reference point comprises a time point at which a large-scale property parameter of a second reference signal is determined; and wherein measuring the large-scale property parameter of the first reference signal according to the indication information comprises: measuring the large-scale property parameter of the first reference signal according to a time domain portion during which a time domain interval occupied by the first reference signal coincides with a time range designated by the first time window information.

10. The communication node of claim 9, wherein the QCL association information comprises a QCL type and the first reference signal which has a QCL relationship with the second reference signal;

wherein the QCL type comprises at least one of QCL type A, QCL type B, QCL type C, or QCL type D.

11. The communication node of claim 10, wherein the second reference signal comprises one of a demodulation reference signal (DMRS), a channel state information reference signal (CSI-RS), or a phase tracking reference signal (PTRS); and the first reference signal comprises one of a synchronization signal/physical broadcast channel block (SSB), a CSI-RS, or a DMRS.

12. The communication node of claim 9, wherein the differently configured window length is in a functional relationship with at least one of following reference factors:

a large-scale property parameter, a QCL type, a function of the second reference signal, a function of the first reference signal, a periodic property of the first reference signal, or a periodic property of the second reference signal;

wherein the periodic property comprises being periodic or aperiodic.

13. A non-transitory read-write storage medium, storing a computer program, wherein a processor executes the computer program to perform the large-scale property parameter measurement method of claim 1.

14. A communication node, comprising a processor, wherein the processor executes a computer program to perform the large-scale property parameter measurement method of claim 5.

15. A non-transitory read-write storage medium, storing a computer program, wherein a processor executes the computer program to perform the large-scale property parameter measurement method of claim 5.

\* \* \* \* \*